(12) United States Patent
Weinstein

(10) Patent No.: US 11,931,694 B1
(45) Date of Patent: Mar. 19, 2024

(54) CARBON DIOXIDE AND NITROGEN OXIDES REMOVAL SYSTEM FOR POINT OF USE ABATEMENT

(71) Applicant: GlobalFoundries U.S. Inc., Malta, NY (US)

(72) Inventor: Justin Weinstein, Clifton Park, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 18/484,497

(22) Filed: Oct. 11, 2023

(51) Int. Cl.
*B01D 53/26* (2006.01)
*B01D 53/86* (2006.01)
*B01D 53/90* (2006.01)
*B01D 53/96* (2006.01)

(52) U.S. Cl.
CPC .......... *B01D 53/90* (2013.01); *B01D 53/265* (2013.01); *B01D 53/8631* (2013.01); *B01D 53/8671* (2013.01); *B01D 53/8696* (2013.01); *B01D 53/96* (2013.01); *B01D 2252/20447* (2013.01); *B01D 2252/20484* (2013.01); *B01D 2252/504* (2013.01); *B01D 2257/404* (2013.01); *B01D 2257/504* (2013.01); *B01D 2258/0216* (2013.01)

(58) Field of Classification Search
CPC .......... B01D 2258/0216; B01D 53/90; B01D 53/265; B01D 53/8631; B01D 53/8671; B01D 53/96; B01D 53/8696; B01D 2257/404; B01D 2252/20484; B01D 2252/20447; B01D 2252/504; B01D 2257/504; B01D 53/62; B01D 53/56
See application file for complete search history.

(56) References Cited

U.S. PATENT DOCUMENTS

| 2,592,762 A | 4/1952 | Taylor et al. |
| 4,112,052 A | 9/1978 | Sartori et al. |
| 6,274,108 B1 | 8/2001 | Fujii et al. |
| 8,840,704 B2 | 9/2014 | Shoji et al. |

FOREIGN PATENT DOCUMENTS

| TW | 442 842 B | * | 6/2001 | |
| WO | WO 2019 232 626 A1 | * | 12/2019 | ............ B01D 53/62 |

OTHER PUBLICATIONS

English translation of TW 442 842 B. (Year: 2001).*
English translation of WO 2019 232 626 A1. (Year: 2019).*
Dugas et al., Absorption and desorption rates of carbon dioxide with monoethanolamine and piperazine, Science Direct Energy Procedia, 2009, pp. 1163-1169.

* cited by examiner

*Primary Examiner* — Timothy C Vanoy
(74) *Attorney, Agent, or Firm* — Francois Pagette; Hoffman Warnick LLC

(57) ABSTRACT

A system to abate an emission stream from a semiconductor manufacturing process is disclosed. The system includes an abatement apparatus, such as a gas scrubber, to remove hazardous and toxic gas species from the emission stream and to yield an emission having carbon dioxide. The system condenses the emission having carbon dioxide to an effluent, and transmits the effluent through a reduction tower. The reduction tower catalyzes a chemical reaction which absorbs carbon dioxide from the effluent using a solution and yields an exhaust substantially free of carbon dioxide. The reduction tower is coupled to an exchanger which catalyzes a thermogenic reaction to release absorbed carbon dioxide from the solution. The system may include a closed-loop system that transmits solution substantially free of carbon dioxide from the exchanger and through the reduction tower to absorb carbon dioxide from additional effluent.

20 Claims, 5 Drawing Sheets

CARBON DIOXIDE AND NITROGEN OXIDES REMOVAL SYSTEM FOR POINT OF USE ABATEMENT

BACKGROUND

The present disclosure relates generally to gas abatement systems and, more particularly, to a carbon dioxide and nitrogen oxide removal system for point of use abatement of an emission stream from a semiconductor manufacturing process.

Semiconductor manufacturing processes often yield emissions having hazardous and toxic gas species. An abatement system is typically coupled to a semiconductor manufacturing process to remove, or substantially remove, these gas species from an emission stream output from the manufacturing process. However, these abatement systems may yield an exhaust having carbon dioxide during operation and nitrogen oxides (NOx), and it would be useful to mitigate carbon dioxide and/or $NO_X$ emissions from the manufacturing process. Embodiments of the present disclosure address these shortcomings, among others, in gas abatement systems.

SUMMARY

All aspects, examples and features mentioned below can be combined in any technically possible way.

An aspect of the disclosure provides a system including: an abatement apparatus configured to abate an emission stream from a semiconductor manufacturing process; a condenser coupled to the abatement apparatus and configured to reduce water vapor of the emission stream and yield an effluent; and a reduction tower coupled to the condenser, where the reduction tower includes: a reduction chamber having an inlet coupled to an outlet of the condenser, and a nozzle disposed within the reduction chamber and configured to dispense a solution therein, which catalyzes a chemical reaction to absorb a pollutant from the effluent and yield an exhaust substantially free of the pollutant.

Another aspect of the disclosure provides a method including: transmitting an emission stream from a semiconductor manufacturing process through an abatement apparatus configured to abate the emission stream therein; transmitting the emission stream from the abatement apparatus through a condenser configured to reduce water vapor of the emission stream and yield an effluent; transmitting the effluent from the condenser through a reduction tower, where the reduction tower comprises a reduction chamber having an inlet coupled to an outlet of the condenser, and a nozzle disposed within the reduction chamber; and dispensing a solution through the nozzle into the reduction chamber, where the solution catalyzes a chemical reaction to absorb a pollutant from the effluent and yield an exhaust substantially free of the pollutant.

Another aspect of the disclosure provides a system including: a reduction tower configured to receive an effluent from a semiconductor manufacturing process, and to dispense an amine solution in an unsaturated state therein which catalyzes a chemical reaction to absorb a pollutant from the effluent; and an exchanger coupled to the reduction tower, wherein the exchanger comprises an exchange chamber including an inlet fluidly coupled to an outlet of the reduction tower, a hot plate disposed within the exchange chamber and configured to catalyze thermal desorption of the pollutant from the amine solution; and an actuator configured to adjust an orientation angle of the hot plate relative to the inlet in response to electrical signals.

Two or more aspects described in this disclosure, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein.

Figure 1:
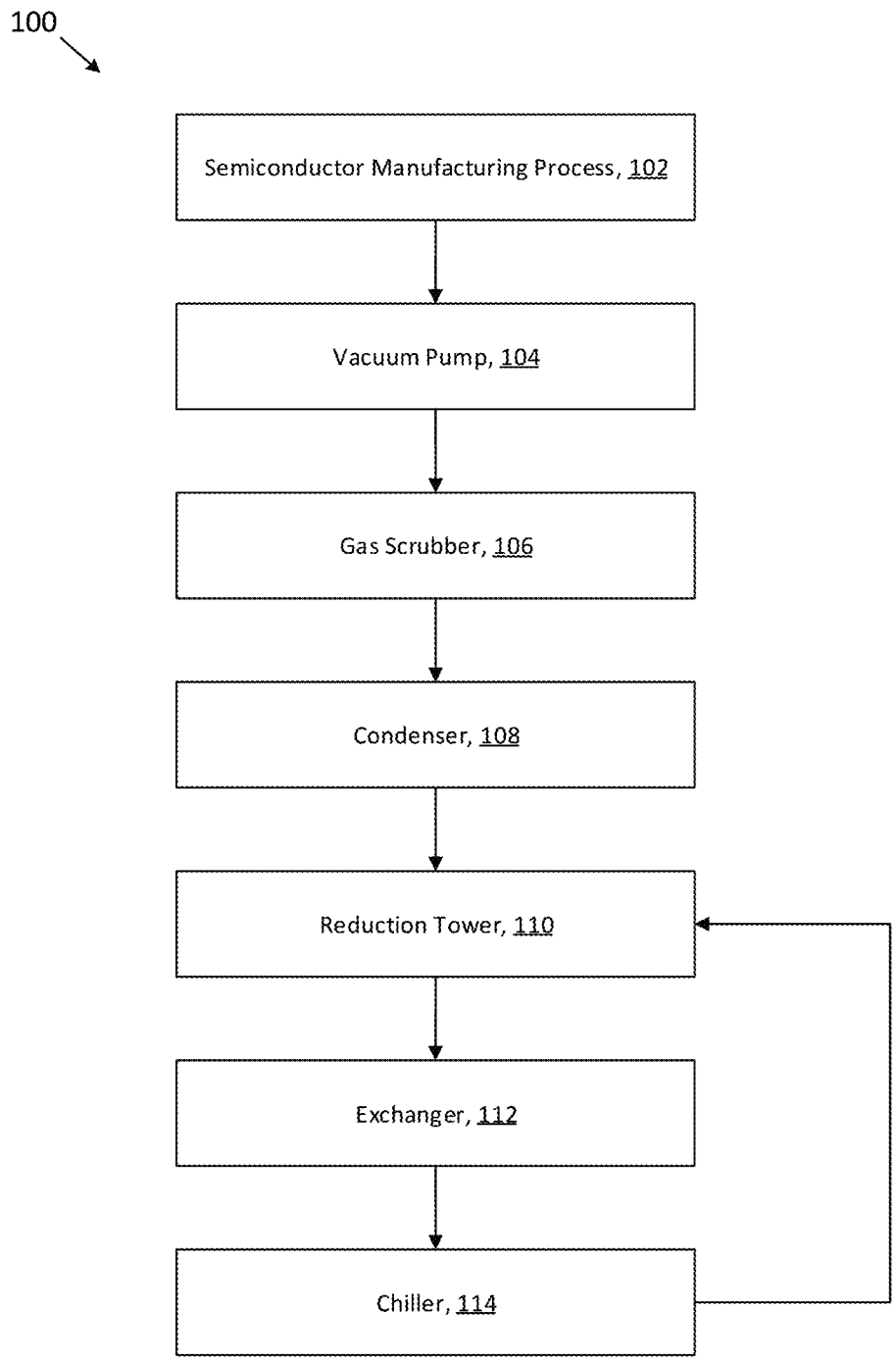
FIG. 1 shows a block diagram of a system for abatement of an emission stream from a semiconductor manufacturing process, according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

Embodiments of the disclosure provide an abatement system and related method to remove harmful and toxic gas species (i.e., abate) in an emission stream from a semiconductor manufacturing process. The system may include a first apparatus fluidly coupled to the manufacturing process and configured to implement a first abatement process to abate the emission stream in the first apparatus. The first apparatus may include, for example, a gas scrubber and/or plasma scrubber configured to implement combustion and/or wet scrubbing to abate the emission stream. The system may include a condenser fluidly coupled to an outlet of the first apparatus and configured to condense the emission stream to an effluent. The system may include a second apparatus fluidly coupled to the condenser and configured to remove a pollutant from the effluent. The second apparatus may include, for example, a reduction tower configured to catalyze a chemical reaction therein to absorb carbon dioxide from the effluent and yield an exhaust substantially free of carbon dioxide.

FIG. 1 shows a block diagram of a system 100 according to embodiments of the disclosure. System 100 includes a semiconductor manufacturing process 102, including any step or series of steps that involve fabricating, processing, and/or otherwise modifying a semiconductor material, integrated circuit chip, etc., via one or more manufacturing devices/tools. Semiconductor manufacturing process 102 may yield a hazardous and toxic byproduct, for example an emission stream including a fluorinated gas, a chlorinated gas, a brominated gas, a hydride gas, or a combination of these gases. In some implementations, semiconductor manufacturing process 102 yields an emission stream including $SiH_4$, $Si_2H_6$, $SiH_2Cl_2$, $Si_2Cl_6$, $GeH_4$, $B_2H_6$, $AsH_4$, $PH_3$, $SiC_8H_{20}O_4$, LTO520, $H_2NSi$, $F_2$, HF, HCl, $Cl_2$, $NF_3$, $NH_3$, $HNO_3$, $TiCl_4$, $BF_3$, $CH_6Si$, $GeF_4$, $BCl_3$, HBr, or a combination of these compounds.

System 100 may transmit the emission stream away from semiconductor manufacturing process 102 and through an abatement device, or combination of abatement devices, configured to remove hazardous and toxic gas species from the emission stream. As shown in FIG. 1, system 100 includes a vacuum pump 104 fluidly coupled to semiconductor manufacturing process 102, which transmits the emission stream away from semiconductor manufacturing process 102 through an abatement device as discussed herein. Vacuum pump 104 may include a nitrogen purge (not shown) which provides a volume of nitrogen ($N_2$) to mix with the emission stream, and which may prevent clogging and/or corrosion of vacuum pump 104. In some implementations, vacuum pump 104 provides a volume of $N_2$ in a range between approximately ten (10) liters per minute and approximately one hundred (100) liters per minute. During operation, combusting $N_2$ within system 100 may catalyze at least one chemical reaction and yield at least one nitrogen-based compound, such as nitric oxide (NO) and/or nitric dioxide ($NO_2$).

As further shown in FIG. 1, vacuum pump 104 is coupled to an abatement apparatus 106 for abating the emission stream therein using one or more techniques. Abatement apparatus 106 may include a gas scrubber and/or plasma scrubber configured to implement combustion and/or wet scrubbing to abate the emission stream. In some implementations, abatement apparatus 106 includes a combustion chamber and/or a water-filled chamber to abate the emission stream therein via combustion and/or wet scrubbing abatement techniques, respectively. In some implementations, abatement apparatus 106 includes a reactive and/or absorbent dry media therein, which catalyzes a chemical reaction on contact with the emission stream to remove at least one pollutant. In some implementations, abatement apparatus 106 provides an oxidant, or combination of oxidants, for combusting the emission stream within the combustion chamber. However, it should be understood that other techniques, ordering of processes, etc., additionally or alternatively may be used by abatement apparatus 106 for abating the emission stream.

System 100 may further include a condenser 108 coupled to abatement apparatus 106. Condenser 108 may be configured to reduce water vapor of the emission stream and yield an effluent thereof. In some implementations, condenser 108 may include a first conduit configured to receive an emission stream in a gas phase therein, and a second conduit having a coolant flowing therein proximate the first conduit. Coolant in the second conduit may absorb heat from the first conduit, and thereby transition a gas-phase emission stream to a liquid-phase effluent. As further shown in FIG. 1, condenser 108 is coupled to a reduction tower 110 configured to remove at least one pollutant from effluent and release an exhaust substantially free of said pollutant (e.g., carbon dioxide, $NO_x$, etc.). Reduction tower 110 may catalyze at least one chemical reaction therein which removes at least one pollutant from effluent. In some implementations, reduction tower 110 catalyzes at least one chemical reaction between effluent and a solution, such as an aqueous amine solution, to remove at least one pollutant from effluent. In some implementations, the aqueous amine solution includes monoethanolamine (MEA) and/or piperazine (C4H10N2), which absorbs carbon dioxide and/or $NO_x$ from effluent. In some implementations, the chemical reaction may cause the solution to transition from an unsaturated state substantially free of carbon dioxide and/or $NO_x$, to a saturated state having carbon dioxide and/or $NO_x$ absorbed from effluent. In the unsaturated state, the solution may absorb carbon dioxide and/or NOx on contact with effluent. In the saturated state, applying heat to the solution may release carbon dioxide and/or $NO_x$, and thereby return the solution to the unsaturated state. In some implementations, the solution may include an ammonia-based solution.

System 100 may further include an exchanger 112 coupled to reduction tower 110 and configured for thermal desorption of at least one pollutant from saturated solution. System 100 may further include a chiller 114 fluidly coupled between exchanger 112 and reduction tower 110, which is configured to dissipate heat from solution transmitted from exchanger 112 through chiller 114 and into reduction tower 110 as discussed herein. Chiller 114 may include any cooling apparatus, or combination of cooling apparatuses, configured to dissipate from solution flowing therein, such as a process water cooling (PWC) apparatus. System 100 therefore cyclically transmits solution through components thereof, including unsaturated solution through reduction tower 110 to remove at least one pollutant from effluent, saturated solution through exchanger 112 to thermally desorb the at least one pollutant from saturated solution, and unsaturated solution through chiller 114 to dissipate heat from solution flowing therein before returning unsaturated solution to reduction tower 110 for further absorption of pollutants from emissions.

Figure 2:
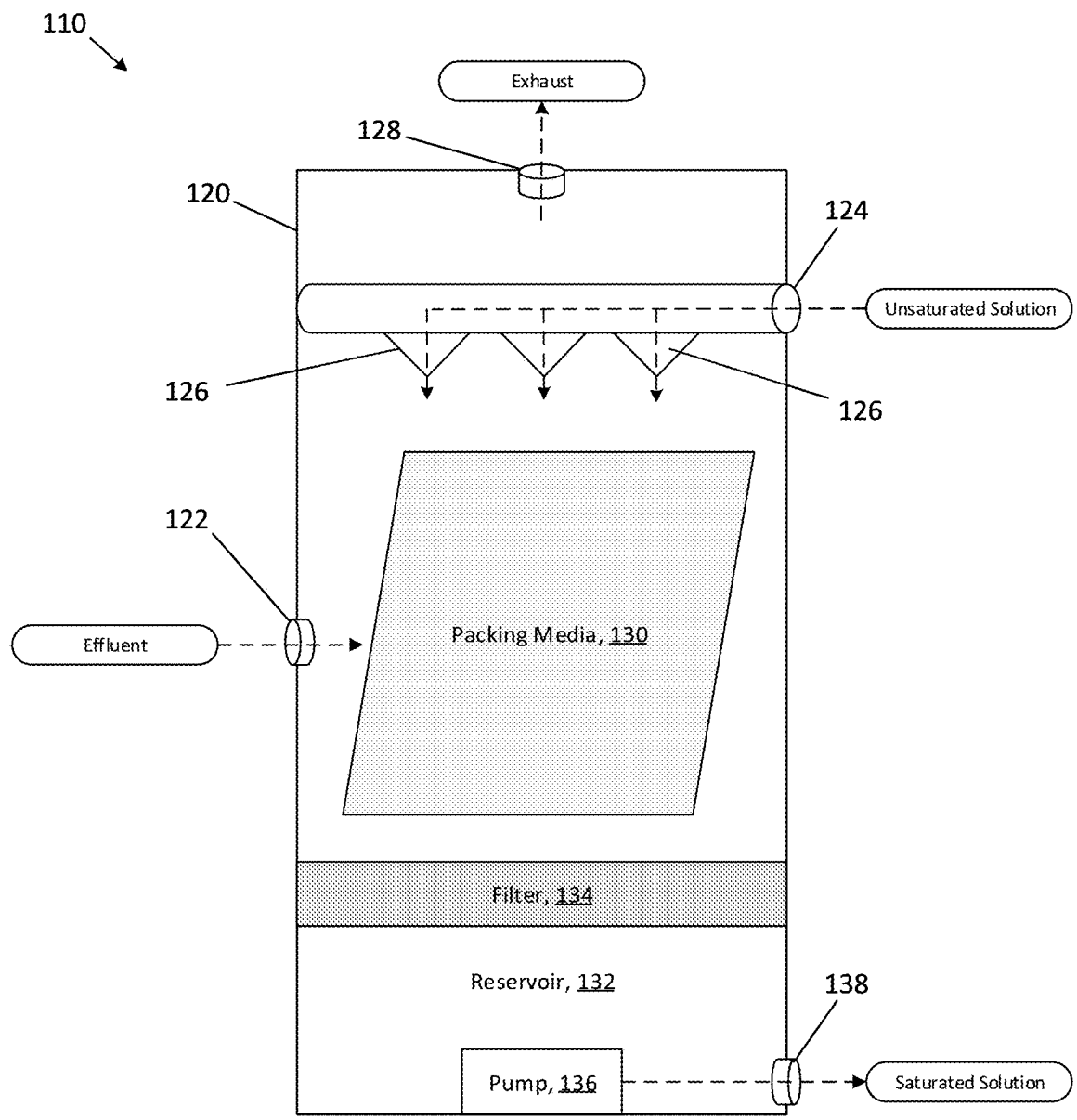
FIG. 2 shows a reduction tower for abatement of an emission stream, according to embodiments of the disclosure.

Referring now to FIG. 2, illustrating reduction tower 110 according to embodiments of the disclosure. Reduction tower 110 may include a reduction chamber 120 configured to catalyze a chemical reaction therein to remove one or more pollutants from effluent and yield an exhaust substantially from of targeted pollutants. Reduction chamber 120 may include a first inlet 122 fluidly coupled to condenser 108 and configured to receive effluent therein. Reduction chamber 120 may include a second inlet 124 configured to receive a solution therein, which may catalyze a chemical reaction within reduction chamber 120 to absorb one or more pollutants from effluent. Reduction tower 110 may include a nozzle 126, or plurality of nozzles 126, coupled to second inlet 124 and configured to dispense a solution within reduction chamber 120 to catalyze the chemical reaction, and in turn remove a pollutant (e.g., carbon dioxide and/or NOx) from effluent disposed therein. In some implementations, reduction tower 110 includes nozzles 126 that are arranged in a plurality of rows which are vertically spaced relative to adjacent rows within reduction chamber 120. For example, nozzles 126 may dispense an unsaturated MEA solution within reduction chamber 120, which in turn absorbs carbon dioxide from effluent therein, and in turn yields exhaust substantially free of carbon dioxide. In some implementations, a chemical reaction to absorb carbon dioxide and/or NOx from effluent may include, for example, the following:

$$CO_2 + 2HOCH_2CH_2NH_2 \Rightarrow HOCH_2CH_2NH_3^+ + HOCH_2CH_2NHCO_2^- \quad (1)$$

$$6NO_2 + 4C_4H_{10}N_2 + Air \Rightarrow 4C_4H_9N_3O + H_2O + O_2 + N_2 \quad (2)$$

$$6NO + 4C_4H_{10}N_2 + Air \Rightarrow 4C_4H_9N_3O + 2H_2O + O_2 + N_2 \quad (3)$$

After the chemical reaction, system 100 may release exhaust from reduction chamber 120 through an exhaust outlet 128. In some implementations, a sensor (not shown) is operatively coupled to reduction tower 110, and configured to measure a property of an exhaust stream flowing through outlet 128. In some implementations, a gas sensor measures concentration of at least one gas species (e.g., $CO_2$, $NO_x$, etc.) within the exhaust stream flowing through outlet 128. In some implementations, reduction tower 110 includes a computing device operatively coupled to the gas sensor, and configured to operate reduction tower 110 in response to sensor signals from the gas sensor which correspond to concentration of carbon dioxide and/or $NO_x$ in exhaust released through outlet 128.

As shown in FIG. 2, reduction tower 110 may include a packing media 130 disposed within reduction chamber 120. Packing media 130 may include an inert media, or combination of inert medias, configured to increase surface area for chemical reactions within reduction chamber 120, e.g., absorbing carbon dioxide and/or NOx from effluent using an aqueous solution of MEA and/or piperazine. For example, packing media 130 may include a plurality of inert, plastic spheres which increase surface area for the chemical reaction within reduction chamber 120. In some implementations, packing media 130 is coated with one or more catalysts configured to increase a reaction rate of chemical reaction within reduction chamber 120. In some implementations, reduction tower 110 is further configured to receive at least one oxidant through first inlet 122, in addition to effluent.

Reduction chamber 120 may include a reservoir 132 positioned proximate to packing media 130 and configured to collect solution therein. In some implementations, reservoir 132 collects solution after the chemical reaction in a saturated state having carbon dioxide absorbed from effluent. In some implementations, reduction tower 110 further includes a filter 134 disposed within reduction chamber 120 between packing media 130 and reservoir 132. Filter 134 may prevent particles from collecting within reservoir 132 (e.g., a particulate filter), yet has a porosity sufficient to enable saturated solution to flow through filter 134 and collect within reservoir 132. Reduction tower 110 may further include a pump 136 disposed within reservoir 132 and configured to transmit saturated solution through an outlet 138 of reduction chamber 120. In some implementations, pump 136 transmits saturated solution from reservoir 132 and through exchanger 112 configured to catalyze thermal desorption of pollutants from saturated solution.

Figure 3:
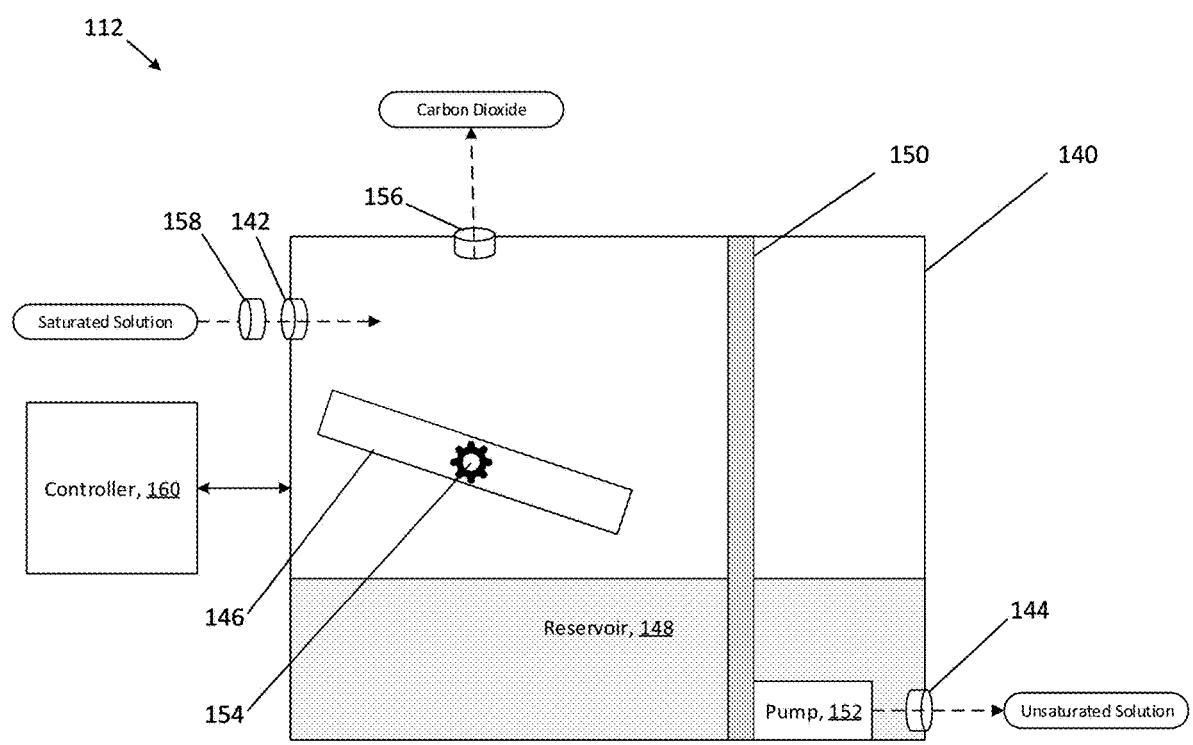
FIG. 3 shows an exchanger for abatement of an emission stream, according to embodiments of the disclosure.

Referring now to FIG. 3, illustrating exchanger 112 in fluid communication with reduction tower 110, according to embodiments of the disclosure. Exchanger 112 may transmit solution in an unsaturated state through reduction tower 110 (e.g., to remove carbon dioxide from effluent), and reduction tower 110 may transmit solution in a saturated state through exchanger 112 (e.g., to remove absorbed carbon dioxide from saturated solution). Exchanger 112 may include an exchange chamber 140 for catalyzing thermal desorption of a pollutant (e.g., carbon dioxide) from a solution (e.g., amine solution). Exchange chamber 140 may include an inlet 142 coupled to outlet 138 of reduction tower 110, and an outlet 144 coupled to second inlet 124 of reduction tower 110. Exchanger 112 may transmit unsaturated solution through outlet 144 to catalyze a chemical reaction within reduction tower 110 and, after the chemical reaction, reduction tower 110 transmits saturated solution through inlet 142 for thermal desorption of carbon dioxide and/or NOx within exchange chamber 140. Exchanger 112 may include a hot plate 146 disposed within exchange chamber 140 between inlet 142 and reservoir 148. During operation, saturated solution may flow through inlet 142 and onto a surface of hot plate 146, thereby heating saturated solution and catalyzing thermal desorption of carbon dioxide and/or NOx on contact with the surface of hot plate 146. Thermal desorption of carbon dioxide from saturated solution may include, for example, the following thermal reaction:

$$HOCH_2CH_2NH_3^+ + HOCH_2CH_2NHCO_2^- \xrightarrow{Heat} CO_2 + 2HOCH_2CH_2NH_2 \quad (4)$$

Moreover, hot plate 146 may be sloped at an orientation angle relative to inlet 142, such that hot plate 146 transmits unsaturated solution to a reservoir 148 of exchange chamber 140 after thermal desorption. In some implementations, reduction tower 110 may include a filter 150 disposed within exchange chamber 140 between hot plate 146 and outlet 144. Filter 150 may prevent particles from collecting within reservoir 148 (e.g., a particulate filter), yet has a porosity sufficient to enable solution to flow through filter 150. Exchanger 112 may include a pump 152 configured to transmit unsaturated solution from reservoir 148 and through outlet 144 of exchange chamber 140. In some implementations, pump 152 transmits unsaturated solution from reservoir 148 and through reduction tower 110 to catalyze chemical reactions to remove at least one pollutant from the emission stream. Exchanger 112 and reduction tower 110 therefore may be fluidly coupled in a closed-loop system which cycles solution therebetween to continuously remove pollutants from emission streams using unsaturated solution within reduction tower 110 and to remove pollutants from saturated solution within exchanger 112. Exchanger 112 may release these removed pollutants from exchange chamber 140 through an exhaust outlet 156. In some implementations, exchanger 112 transmits carbon dioxide to a compressor configured to compress carbon dioxide and/or NOx for disposal and/or use in another process (not shown).

Exchanger 112 may further include an actuator 154 operatively coupled to hot plate 146. Actuating actuator 154 may adjust an orientation angle of hot plate 146 relative to inlet 142. Actuator 154 may include any mechanism, or combination of mechanisms, configured to selectively contact and/or move hot plate 146 relative to inlet 142. In some implementations, actuator 154 is configured to move hot plate 146 within exchange chamber 140 relative to an origin of a coordinate system. In some implementations, actuator 154 may displace hot plate 146 (e.g., by linear motion) along at least one axis of the coordinate system, rotate hot plate 146 about at least one axis of the coordinate system, or otherwise manipulate a position of hot plate 146 within exchange chamber 140 in various directions relative to the origin of the coordinate system. In some implementations, an external device may transmit electrical signals to actuator 154 corresponding to movement instructions for displacing and/or rotating hot plate 146 within exchange chamber 140.

As further shown in FIG. 3, a sensor 158 may be operatively coupled to exchanger 112 and configured to measure at least one characteristic of solution, devices, and/or systems described herein. Sensor 158 may include any sensor, or combination of sensors, for measuring at least one characteristic of solution and/or system 100 and components thereof. Sensor 158 may include temperature sensors, conductance sensors, total dissolved solids sensors, pressure sensors, flow rate meter sensors, gas sensors, or a combination of these sensors. In some implementations, sensor 158 includes at least one flow meter (e.g., electromagnetic flow meter, turbine flow meter, vortex flow meter, etc.) to measure flow rate of the effluent within system 100. For example, sensor 158 may include a first flow meter which measures an in-flow rate of saturated solution into exchanger 112, and a second flow meter which measures an out-flow rate of unsaturated solution out of exchanger 112. In some implementations, sensor 158 includes at least one temperature sensor (e.g., thermometer, thermocouple, etc.) to measure temperature of the solution. For example, sensor 158 may include a thermocouple which measures temperature of the solution flowing into and/or out of exchange chamber 140. In some implementations, sensor 158 includes a plurality of sensors that collectively measure a plurality of attributes of the emission stream, the solution, system 100, operating conditions, etc. Moreover, sensor 158 may transmit sensor signals indicative of at least one characteristic of the solution.

In some implementations, a controller 160 may be operatively coupled to sensor 158 and actuator 154. Controller 160 may receive sensor signals from sensor 158 indicating at least one characteristic of solution flowing into exchange chamber 140, and in response to said sensor signals, actuate actuator 154 to adjust orientation angle of hot plate 146 relative to inlet 142. Controller 160 may include any computing device, or combination of computing devices, capable of receiving and transmitting electrical signals to observe, operate, or otherwise engage system 100 and components thereof. Controller 160 may communicate with external devices over a network, such as a wide area network (WAN) and/or local area network (LAN). In some implementations, an external computing device may communicate with controller 160 to exchange information about system 100, operating conditions, etc. In some implementations, an external computing device may transmit electrical signals to controller 160 that correspond to commands for operating system 100. In some implementations, the external computing device provides a graphical user interface (GUI), which enables a user to observe, operate, or otherwise engage system 100 through the external computing device. In some implementations, controller 160 may be further configured to adjust a temperature of hot plate 146. Controller 160 therefore may monitor, operate, or otherwise engage external devices in response to sensor signals from sensor 158 corresponding with characteristic measurements of solution, devices, and/or systems described herein.

Figure 4:
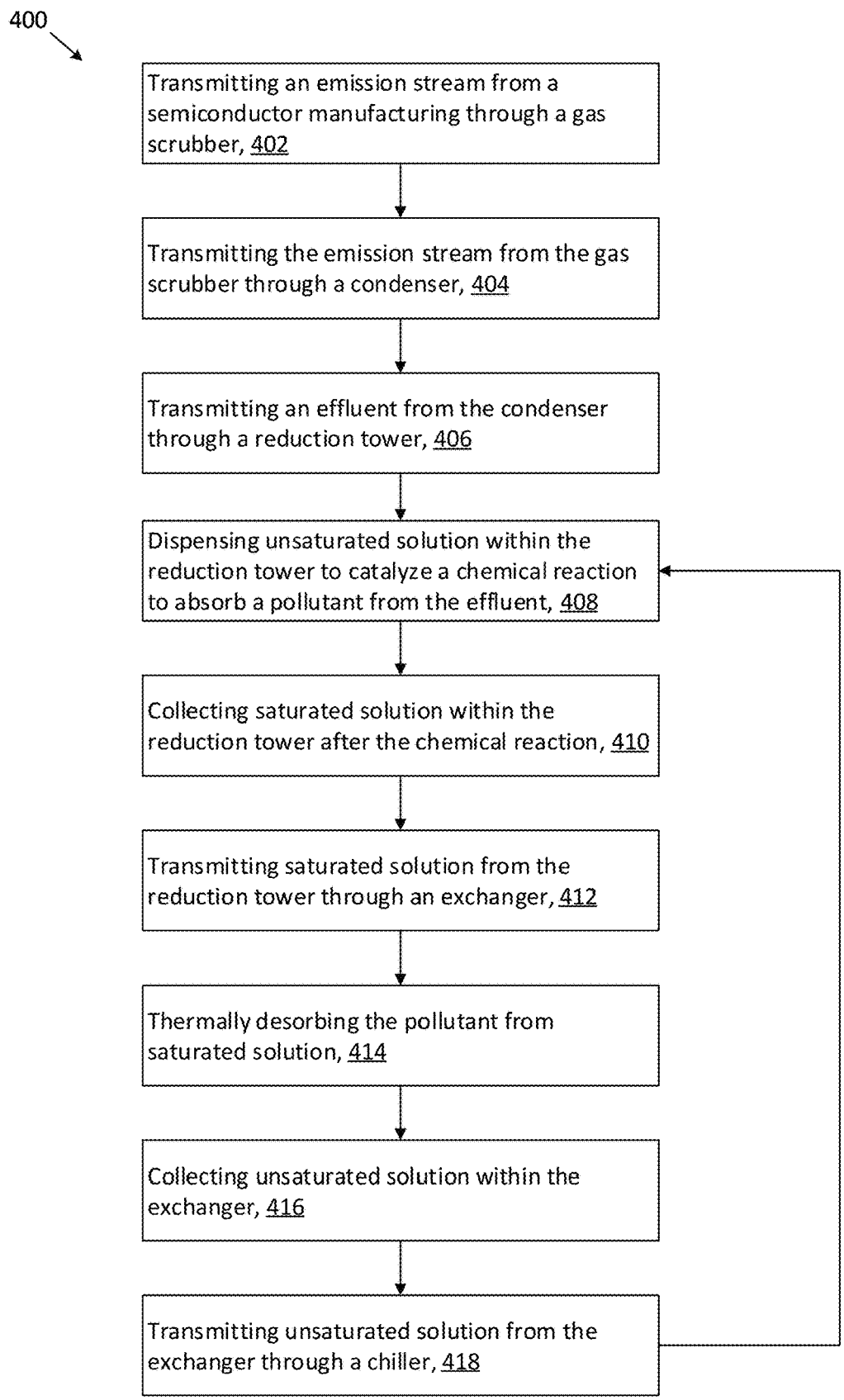
FIG. 4 shows an illustrative flow diagram for a method for abatement of an emission stream, according to embodiments of the disclosure.

Referring now to FIG. 4, showing a method 400 to abate an emission stream according to embodiments of the disclosure. Method 400 may include, but is not limited to, a step or series of steps to abate the emission stream using system 100 as shown in FIG. 4 and discussed herein.

At step 402, method 400 may include transmitting an emission stream from a semiconductor manufacturing process through a gas scrubber. At step 404, method 400 may include transmitting the emission stream from the gas scrubber through a condenser. At step 406, method 400 may include transmitting an effluent from the condenser through a reduction tower. At step 408, method 400 may include dispensing an unsaturated solution within the reduction tower to catalyze a chemical reaction to absorb a pollutant from effluent. At step 410, method 400 may include collecting saturated solution within the reduction tower after the chemical reaction. At step 412, method 400 may include transmitting saturated solution from the reduction tower through an exchanger. At step 414, method 400 may include thermally desorbing the pollutant from saturated solution. At step 416, method 400 may include collecting unsaturated solution within the exchanger. At step 418, method 400 may include transmitting unsaturated solution from the exchanger through a chiller. Unsaturated solution is transmitted through the chiller at step 418, and method 400 may then dispense unsaturated solution within the reduction at step 408. As such, method 400 may cycle solution through a system for absorbing a pollutant from effluent within the reduction tower, and thermally desorbing the pollutant within the exchanger.

Method 400 therefore may include, with reference to FIGS. 1-3, the following series of steps, including: at step 402, transmitting an emission stream from semiconductor manufacturing process 102 through abatement apparatus 106 (FIG. 1); at step 404, transmitting the emission stream from abatement apparatus 106 through condenser 108; at step 406, transmitting an effluent from condenser 108 through reduction tower 110; at step 408, dispensing unsaturated solution within reduction tower 110 to catalyze a chemical reaction to absorb carbon dioxide and/or $NO_x$ from effluent; at step 410, collecting saturated solution within reduction tower 110 after the chemical reaction; at step 412, transmitting saturated solution from reduction tower 110 through exchanger 112; at step 414, thermally desorbing carbon dioxide from saturated solution; and at step 416, collecting unsaturated solution within exchanger 112 after thermal desorption; and at step 418 transmitting unsaturated solution from exchanger 112 through chiller 114. However, method 400 may additionally or alternatively include other steps, combinations of steps, and/or arrangement thereof.

Figure 5:
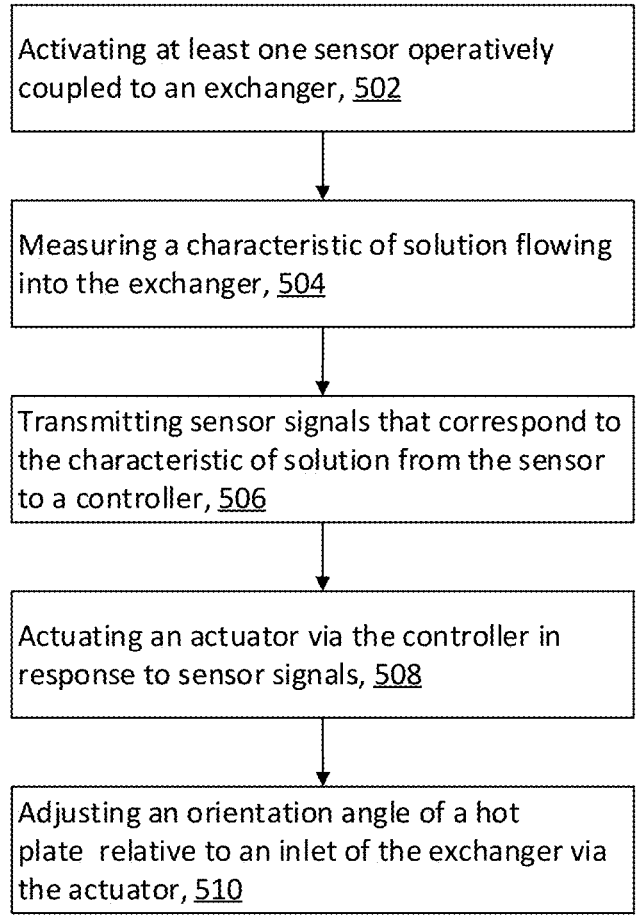
FIG. 5 shows an illustrative flow diagram for a method for adjusting an orientation angle of a hot plate, according to embodiments of the disclosure.

Referring now to FIG. 5, showing a method 500 to abate an emission stream according to embodiments of the disclosure. Method 500 may include, but is not limited to, a step or series of steps to abate the emission stream using system 100 as shown in FIG. 5 and discussed herein.

At step 502, method 500 may include activating at least one sensor operatively coupled to an exchanger. At step 504, method 500 may include measuring a characteristic of solution flowing into the exchanger via the sensor. At step 506, method 500 may include transmitting sensor signals that correspond to the characteristic of solution from the sensor to a controller. At step 508, method 500 may include actuating an actuator via the controller in response to the sensor signals. At step 510, method 500 may include adjusting an orientation angle of a hot plate relative to an inlet of the exchanger via the actuator. Method 500 therefore may include, with reference to FIGS. 1-4, the following series of steps, including: at step 502, activating at least one sensor 158 operatively coupled to exchanger 112; at step 504, measuring a characteristic of saturated solution flowing into exchanger 112 via sensor 158; at step 506, transmitting sensor signals that correspond to the characteristic of the solution from sensor 158 to controller 160; at step 508, actuating actuator 154 via controller 160 in response to sensor signals from sensor 158; and at step 510, adjusting an orientation angle of hot plate 146 relative to inlet 142 of exchanger 112. However, method 500 may additionally or alternatively include other steps, combinations of steps, and/or arrangement thereof.

Embodiments of the present disclosure provide technical and commercial advantages, examples of which are discussed herein. Embodiments of the disclosure may improve operational performance for abatement of an emission stream from a semiconductor manufacturing process. Embodiments of the disclosure provide an abatement system that, for example, reduces carbon dioxide content in the resulting emission stream relative to conventional processes. Embodiments of the disclosure moreover may increase operational duration of abatement systems, for example by increasing particulate filtration/removal efficiency and thereby mitigating risk of blocking emission stream flow therein.

For purposes of this disclosure, a semiconductor material refers to a material whose conducting properties can be altered by doping with an impurity. Such semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used.

The structure and method as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (A) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed. It will be further understood that the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof "Optional" or "optionally" means that the subsequently described event or circumstance may or may not occur, and that the description includes instances where the event occurs and instances where it does not. It will be further understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A system comprising:
   an abatement apparatus configured to abate an emission stream from a semiconductor manufacturing process;
   a condenser coupled to the abatement apparatus and configured to reduce water vapor of the emission stream and yield an effluent; and
   a reduction tower coupled to the condenser, wherein the reduction tower comprises:
      a reduction chamber having an inlet coupled to an outlet of the condenser, and
      a nozzle disposed within the reduction chamber and configured to dispense a solution therein, which catalyzes a chemical reaction to absorb a pollutant from the effluent and yield an exhaust substantially free of the pollutant.

2. The system of claim 1, wherein the solution comprises an amine solution including at least one of monoethanolamine (MEA) and piperazine, and wherein the pollutant comprises at least one of carbon dioxide, nitrogen dioxide, and nitric oxide.

3. The system of claim 1, wherein the reduction tower further comprises:
   a packing media disposed within the reduction chamber and configured to increase surface area for the chemical reaction;
   a reservoir disposed within the reduction chamber and configured to collect the solution in a saturated state after the chemical reaction; and
   a filter disposed between the packing media and the reservoir, and configured to prevent particulate build-up in the reservoir.

4. The system of claim 3, further comprising an exchanger coupled to the reduction tower, wherein the exchanger comprises:
   an exchange chamber having an inlet coupled to an outlet of the reduction tower, and an outlet coupled to a second inlet of the reduction tower;
   a hot plate disposed within the exchange chamber proximate the inlet and configured to catalyze thermal desorption of the pollutant from the solution in the saturated state; and
   a reservoir disposed within the exchange chamber and configured to collect the solution in an unsaturated state after thermal desorption.

5. The system of claim 4, further comprising a chiller fluidly coupled between the exchanger and the reduction tower, wherein the chiller comprises process cooling water configured to dissipate heat from the solution flowing from the exchanger and through the chiller.

6. The system of claim 4, wherein the exchanger comprises an actuator configured to adjust an orientation angle of the hot plate relative to the inlet of the exchange chamber in response to electrical signals.

7. The system of claim 6, further comprising a controller operatively coupled to the exchanger, wherein the actuator is configured to adjust the orientation angle of the hot plate in response to electrical signals from the controller.

8. The system of claim 7, further comprising:
   a sensor operatively coupled to the controller and configured to measure a characteristic of the solution flowing through the exchanger,
   wherein the controller is configured to transmit electrical signals to the actuator in response to sensor signals from the sensor corresponding to the characteristic of the solution, thereby actuating the actuator and adjusting the orientation angle of the hot plate.

9. The system of claim 8, wherein the characteristic of the solution measured by the sensor includes at least one of a flow rate and a temperature.

10. The system of claim 7, further comprising a digital display operatively coupled to the controller and configured to display a graphical user interface (GUI) having a widget,
    wherein the controller is configured to transmit electrical signals to the actuator in response to user engagement of the widget, thereby actuating the actuator and adjusting the orientation angle of the hot plate.

11. A method comprising:
    transmitting an emission stream from a semiconductor manufacturing process through an abatement apparatus configured to abate the emission stream therein;
    transmitting the emission stream from the abatement apparatus through a condenser configured to reduce water vapor of the emission stream and yield an effluent;
    transmitting the effluent from the condenser through a reduction tower, wherein the reduction tower comprises a reduction chamber having an inlet coupled to an outlet of the condenser, and a nozzle disposed within the reduction chamber; and
    dispensing a solution through the nozzle into the reduction chamber,
    wherein the solution catalyzes a chemical reaction to absorb a pollutant from the effluent and yield an exhaust substantially free of the pollutant.

12. The method of claim 11, further comprising:
    collecting the solution in a saturated state within a reservoir disposed within the reduction chamber, after the chemical reaction;
    transmitting the solution from the reduction tower through an exchanger fluidly coupled to the reservoir within the reduction chamber;
    thermally desorbing the pollutant from the solution in the saturated state via a hot plate of the exchanger; and
    collecting the solution in an unsaturated state within a reservoir of the exchanger, after thermal desorption of the pollutant.

13. The method of claim 12, further comprising adjusting an orientation angle of the hot plate relative to an inlet of the exchanger, wherein the exchanger comprises an actuator configured to adjust the orientation angle in response to electrical signals.

14. The method of claim 13, wherein adjusting the orientation angle comprises:
    measuring a characteristic of the solution flowing into the exchanger;

transmitting sensor signals from the sensor to a controller coupled to the actuator; and using the controller, actuating the actuator in response to sensor signals from the sensor corresponding to the characteristic of the solution and thereby adjusting the orientation angle of the hot plate.

15. The method of claim 14, wherein measuring the characteristic of the solution comprises:

measuring a flow rate of the solution via a first sensor; and measuring a temperature of the solution via a second sensor.

16. The method of claim 12, further comprising:

transmitting the solution through a chiller fluidly coupled between the exchanger and the reduction tower, wherein the chiller is configured to dissipate heat from the solution in the unsaturated state flowing from the exchanger, through the chiller, and into the reduction tower, wherein the solution comprises an amine solution including at least one of monoethanolamine (MEA) and piperazine, and wherein the pollutant comprises at least one of carbon dioxide and a nitrogen oxide.

17. A system comprising:

a reduction tower configured to receive an effluent from a semiconductor manufacturing process, and to dispense an amine solution in an unsaturated state therein which catalyzes a chemical reaction to absorb a pollutant from the effluent; and an exchanger coupled to the reduction tower, wherein the exchanger comprises an exchange chamber including an inlet fluidly coupled to an outlet of the reduction tower, a hot plate disposed within the exchange chamber and configured to catalyze thermal desorption of the pollutant from the amine solution; and an actuator configured to adjust an orientation angle of the hot plate relative to the inlet in response to electrical signals.

18. The system of claim 17, further comprising:

an abatement apparatus configured to abate an emission stream from the semiconductor manufacturing process;

a condenser fluidly coupled between the abatement apparatus and a first inlet of the reduction tower, wherein the condenser is configured to reduce water vapor of the emission stream and yield the effluent; and a chiller fluidly coupled between an outlet of the exchanger and a second inlet of the reduction tower, wherein the chiller comprises process cooling water configured to dissipate heat from the amine solution flowing from the outlet of the exchanger, through the chiller, and through the second inlet of the reduction tower.

19. The system of claim 18, further comprising:

a controller operatively coupled to the exchanger; and a sensor operatively coupled to the controller and configured to measure a characteristic of the amine solution flowing through the exchanger, wherein the actuator is configured to adjust the orientation angle of the hot plate in response to electrical signals from the controller, and wherein the controller is configured to transmit electrical signals to the actuator in response to sensor signals from the sensor which correspond to the characteristic of the solution.

20. The system of claim 17, wherein the sensor comprises a first sensor configured to measure flow rate of the solution through the inlet of the exchanger, and a second sensor configured to measure temperature of the solution flowing through the inlet of the exchanger.

* * * * *